US006941892B1

(12) United States Patent
Johnson

(10) Patent No.: US 6,941,892 B1
(45) Date of Patent: Sep. 13, 2005

(54) BIRD FEEDER SUPPORT

(76) Inventor: Richard R. Johnson, 428 Brady Rd., Hayfork, CA (US) 96041

( * ) Notice: Subject to any disclaimer, the term of this patent is extended or adjusted under 35 U.S.C. 154(b) by 0 days.

(21) Appl. No.: 10/800,337

(22) Filed: Mar. 15, 2004

(51) Int. Cl.[7] .......................... A01K 61/02; A47H 1/10
(52) U.S. Cl. .................. 119/57.8; 119/429; 119/51.03; 119/51.01; 248/317
(58) Field of Search .............................. 119/51.01, 429, 119/428, 51.03, 52.2, 57.8, 57.9, 459–481; D30/121, 133, 124–128; 116/148–172; D10/116; 248/318, 317, 322, 339

(56) References Cited

U.S. PATENT DOCUMENTS

| D56,280 | S | * | 9/1920 | Forbes ...................... D10/116 |
|---|---|---|---|---|
| 1,791,175 | A | * | 2/1931 | Tomlinson .................. 119/464 |
| 1,794,718 | A | * | 3/1931 | Little .......................... 292/24 |
| 2,133,637 | A | * | 10/1938 | Shulman ..................... 119/468 |
| 2,783,155 | A | | 2/1957 | Haug |
| 3,151,600 | A | | 10/1964 | Crouch et al. |
| 3,503,372 | A | * | 3/1970 | Saurer .......................... 119/55 |
| D224,823 | S | * | 9/1972 | Roberts ........................ D6/450 |
| 4,331,104 | A | | 5/1982 | Clarke |
| 4,958,595 | A | * | 9/1990 | Richman et al. ............ 119/52.2 |
| 5,033,708 | A | | 7/1991 | Brue et al. |
| 5,063,877 | A | | 11/1991 | Riggi |
| D329,509 | S | * | 9/1992 | Burleigh ..................... D30/124 |
| 6,024,047 | A | * | 2/2000 | Hoogland ................. 119/51.03 |
| D426,683 | S | * | 6/2000 | Rogers ....................... D30/124 |

FOREIGN PATENT DOCUMENTS

| CH | 613603 A5 | * | 10/1979 | ........ A01K 39/012 |
|---|---|---|---|---|
| GB | 2275408 | * | 8/1994 | .......... A01K 39/01 |
| WO | WO 94/07360 | * | 4/1994 | ........ A01K 39/012 |

* cited by examiner

Primary Examiner—Peter M. Poon
Assistant Examiner—Andrea M. Valenti

(57) ABSTRACT

A bird feeder support for supporting a solid bell-shaped bird feeder includes a base having an upper surface, a lower surface and a peripheral edge. Each of a pair of legs has a first and a second end. The first ends are each attached to the base such that each of the legs extends upwardly from the base. Each of the legs is arced such that the second ends abut each other and an inner perimeter edge of the legs is defined. A coupler is adapted for removably securing a bird feeder to the pair of legs such that the bird feeder is suspended between the legs.

6 Claims, 3 Drawing Sheets

US 6,941,892 B1

BIRD FEEDER SUPPORT

BACKGROUND OF THE INVENTION

1. Field of the Invention

The present invention relates to bird feeder devices and more particularly pertains to a new bird feeder device for supporting a solid mass of seeds shaped into the form of a bell and defining a bird feeder.

2. Description of the Prior Art

The use of bird feeder devices is known in the prior art. U.S. Pat. No. 5,063,877 describes a device for holding a plurality of bird seeds within a housing and having a plurality of bird perches thereon. Another type of bird feeder device is U.S. Pat. No. 5,033,708 having an upwardly extending post thereon which may be extended upwardly into a bird bell type bird feeder. Yet another bird feeder is U.S. Pat. No. 3,151,600 which again defines a housing for holding bird seed.

While these devices fulfill their respective, particular objectives and requirements, the need remains for a better support for bird bells which are seeds held together in the shape of a bell so that birds may freely pick the seeds away from the bell but which retains seeds so that many are not lost as often happens with loose seeds placed within a conventional bird feeder. Typical supports for such bird bells do not include a housing for protecting the bird bell from the elements nor do they offer bird perching capabilities. For this reason, such a support is needed that can protect the bird bell from the elements and offer bird perches. An additional advantage would be the capability to hang the bird bell so that it is spaced from the ground.

SUMMARY OF THE INVENTION

The present invention meets the needs presented above generally comprises a base having an upper surface, a lower surface and a peripheral edge. Each of a pair of legs has a first and a second end. The first ends are each attached to the base such that each of the legs extends upwardly from the base. Each of the legs is arced such that the second ends abut each other and an inner perimeter edge of the legs is defined. A coupler is adapted for removably securing a bird feeder to the pair of legs such that the bird feeder is suspended between the legs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
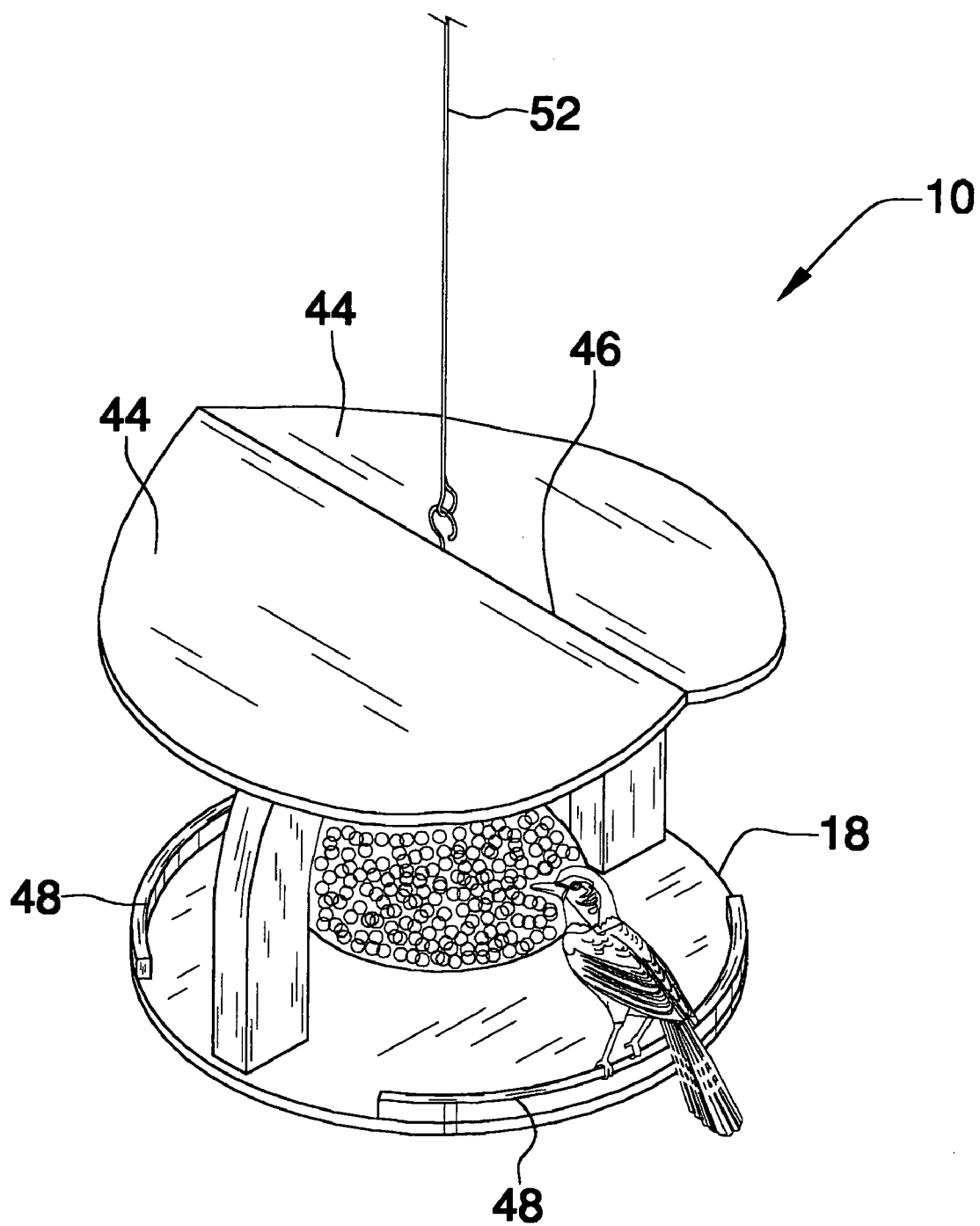
FIG. 1 is a perspective view of a bird feeder support according to the present invention.
Figure 2:
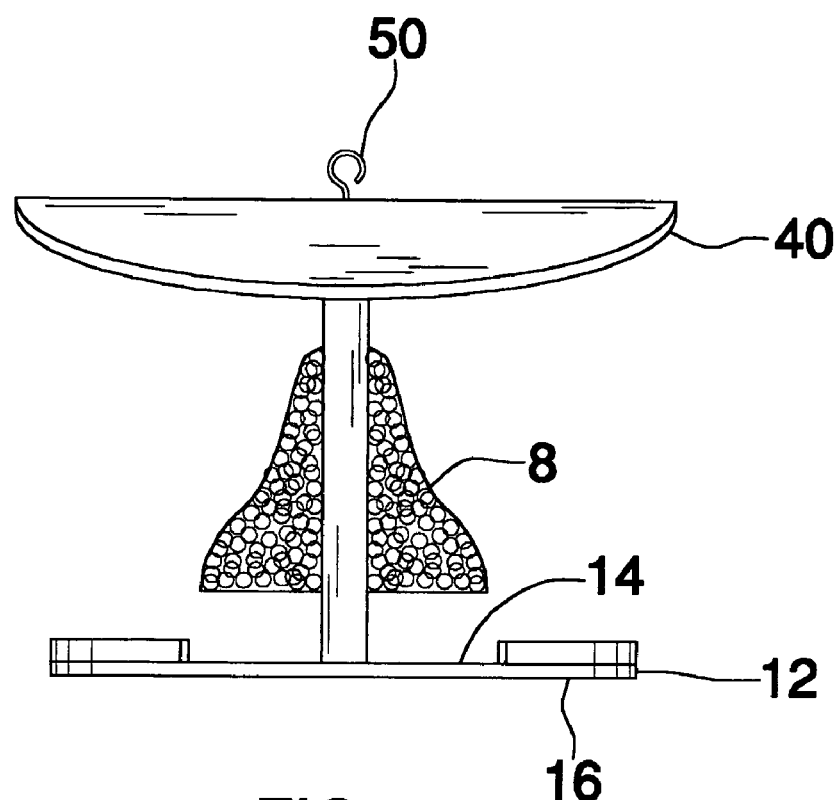
FIG. 2 is a side view of the present invention.

With reference now to the drawings, and in particular to FIGS. 1 through 4 thereof, a new bird feeder device embodying the principles and concepts of the present invention and generally designated by the reference numeral 10 will be described.

As best illustrated in FIGS. 1 through 4, the bird feeder support 10 generally comprises a device for supporting a bird bell which is a bell-shaped bird feeder 8 comprising a plurality of seeds formed into a solid mass having the shape of a bell. Such bird bells may be found from a variety of sources. Information on one type of these bird feeders 8 can be found at on the Internet at www.kaytee.com/products/wild_birds/index.phtml. The support 10 includes a base 12 that has an upper surface 14, a lower surface 16 and a peripheral edge 18. The base 12 preferably has a generally circular shape though other shapes, such as rectangular, may be used as well.

Figure 3:
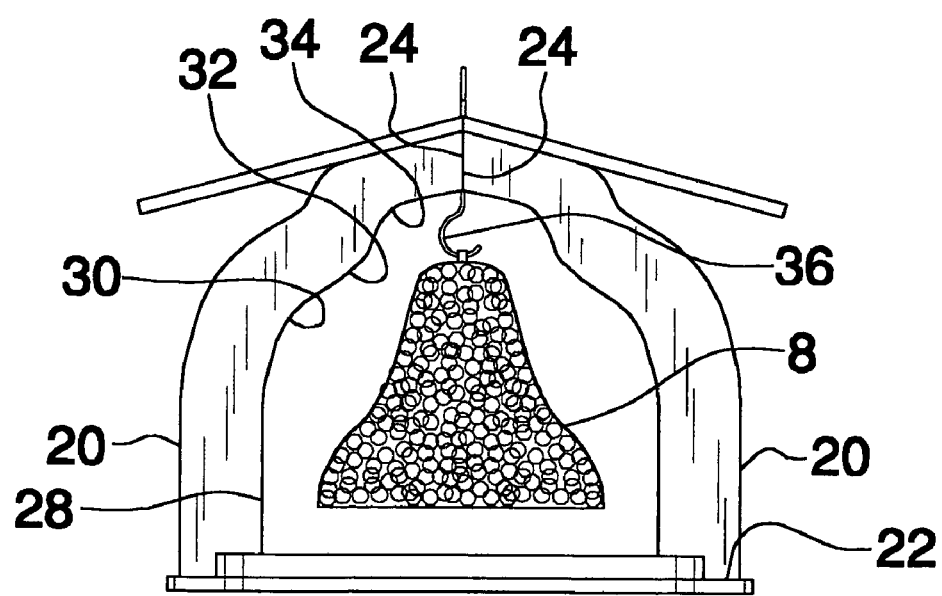
FIG. 3 is a front view of the present invention.

Each of a pair of legs 20 has a first 22 and a second end 24. Each of the first ends 22 is attached to the base 12 such that each of the legs 20 extends upwardly from the base 12. Each of the legs 20 is arced such that the second ends 24 abut each other and an inner perimeter edge 26 of the legs 20 is defined. The inner perimeter edge 26 has a generally bell-shaped configuration. This includes generally upwardly extending portions 28, an inwardly extending arc 30 followed by an upwardly extending arc 32 and then finishing with an inwardly extending arc 34 so that that to legs 20 come together as shown in FIG. 3.

A coupler 36 is adapted for removably securing the bird feeder 8 to the pair of legs 20. The coupler 36 preferably comprises a hook that is attached to and extends downwardly from a juncture of the second ends 24 of the legs 20. The bird feeder 8 typically has a loop thereon so that the bird feeder 8 may be attached to the legs 12 such that the bird feeder 8 is suspended between the legs 20.

A cover 40 is attached to an outer perimeter edge 42 of the legs 20 such that the cover 40 extends over the base 12. The cover 40 preferably includes a pair of plates 44 joined along a common edge 46. Each of the plates 44 is angled downward from the common edge 46.

Each of a pair of ridges 48 is attached to and extends upwardly from the base 12. Each of the ridges 48 is positioned adjacent to the peripheral edge 18. The ridges 48 are positioned oppositely with respect to each other on the base 12. The ridges 48 form bird perches.

A securing member 50 is attached to the cover 40 and extends upwardly therefrom. The securing member 50 is adapted for releasably securing the cover 40 to a tether 52. The securing member 50 is preferably a hook or loop.

Figure 4:
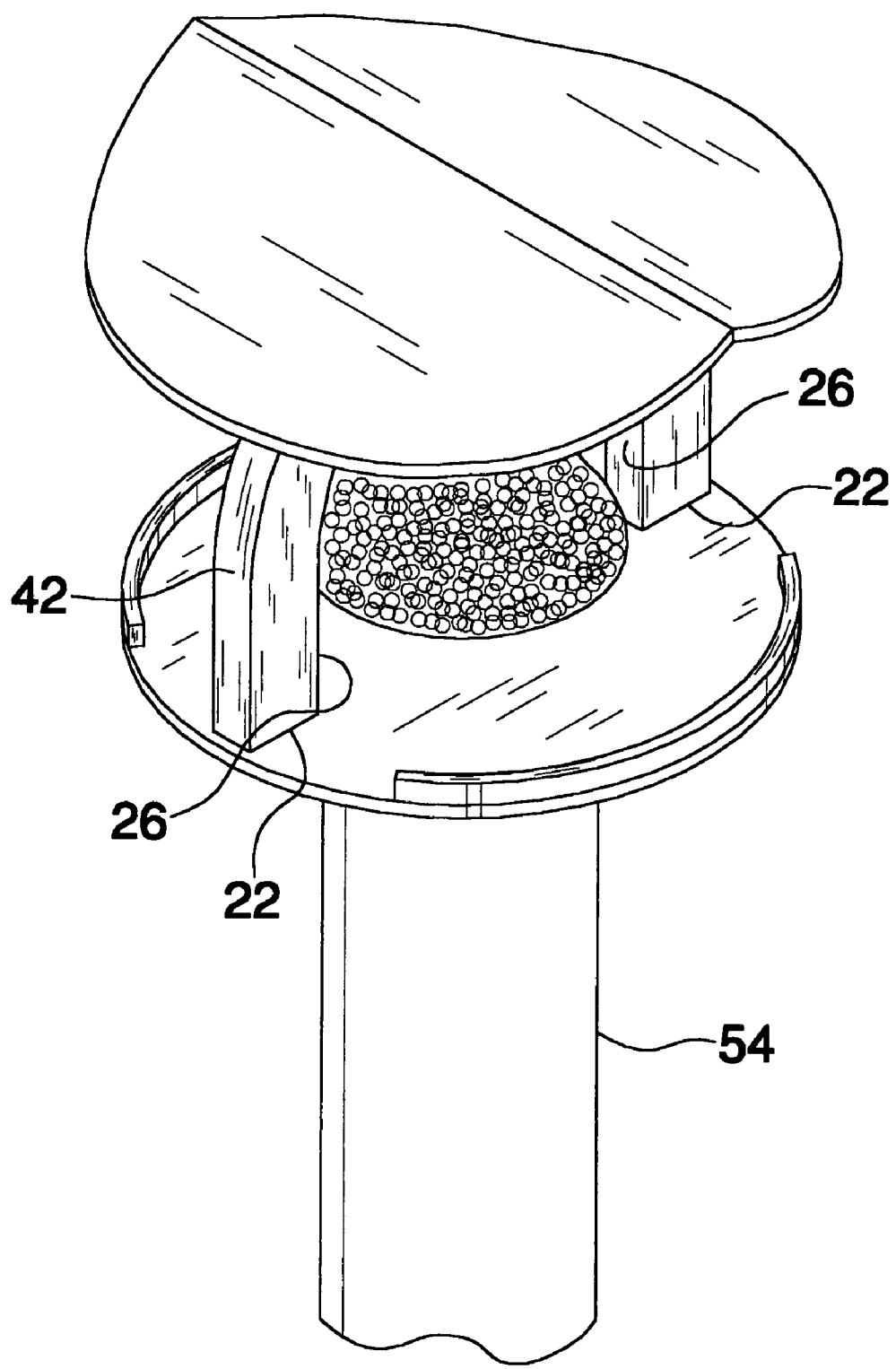
FIG. 4 is a perspective view of a second embodiment of the present invention.

A second embodiment is shown in FIG. 4. This embodiment does not require the securing member 50 and displays how the support 10 may be mounted on a post 54.

In use, the bird feeder 8 is hung from the coupler 36 so that it is easily accessible to birds. The support 10 is then preferably hung from a tree branch or other implement positioned above the ground.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bird feeding assembly, said assembly consisting of:
   a substantially solid mass of bird seed;
   a base having an upper surface, a lower surface and a peripheral edge;
   a pair of legs, each of said legs having a first and a second end, each of said first ends being attached to said base such that each of said legs extends upwardly from said base, each of said legs being arced such that said second ends abut each other and an inner perimeter edge of said legs is defined;
   a cover being attached to an outer perimeter edge of said legs such that said cover extends over said base and
   a coupler being attached to said pair of legs, said coupler being removably securable to said bird seed such that said bird seed is suspended between said legs.

2. The bird feeding assembly according to claim 1, wherein said inner perimeter edge has a generally bell-shaped configuration.

3. The bird feeding assembly according to claim 1, wherein said coupler comprises a hook being attached to and extending downwardly from a juncture of said second ends of said legs.

4. The bird feeding assembly according to claim 1, said cover including a pair of plates joined along a common edge, each of said plates being angled downward from said common edge.

5. The bird feeding assembly according to claim 1, further including a pair of ridges, each of said ridges being attached to and extending upwardly from said base, each of said ridges being positioned adjacent to said peripheral edge, said ridges being positioned oppositely with respect to each other on said base.

6. A bird feeding assembly, said assembly consisting of:
   a base having an upper surface, a lower surface and a peripheral edge;
   a pair of legs, each of said legs having a first and a second end, each of said first ends being attached to said base such that each of said legs extends upwardly from said base, each of said legs being arced such that said second ends abut each other and an inner perimeter edge of said legs is defined, said inner perimeter edge having a generally bell-shaped configuration;
   a coupler being attached to said pair of legs, said coupler comprising a hook being attached to and extending downwardly from a juncture of said second ends of said legs, said coupler being removably securable to a solid mass of bird seed such that the bird seed is suspended between the legs;
   a cover being attached to an outer perimeter edge of said legs such that said cover extends over said base, said cover including a pair of plates joined along a common edge, each of said plates being angled downward from said common edge;
   a pair of ridges, each of said ridges being attached to and extending upwardly from said base, each of said ridges being positioned adjacent to said peripheral edge, said ridges being positioned oppositely with respect to each other on said base; and
   a securing member being attached to said cover and extending upwardly therefrom, said securing member being adapted for releasably securing said cover to a tether.

\* \* \* \* \*